United States Patent Office 3,743,601
Patented July 3, 1973

3,743,601
PROCESS FOR MAKING SILICATE FOAMS FROM ALKALI METAL SILICATES
Ramesh P. Rao, Sarnia, Ontario, Canada, assignor to Fiberglas Canada Ltd., Toronto, Ontario, Canada
No Drawing. Continuation-in-part of abandoned application Ser. No. 875,568, Nov. 10, 1969. This application Nov. 4, 1970, Ser. No. 86,931
Int. Cl. C04b 21/00; F16l 59/00
U.S. Cl. 252—62
17 Claims

ABSTRACT OF THE DISCLOSURE

A process for economically forming micro cellular, inorganic silicate foams for use in building construction and having good structural, thermal and sound insulation properties. The process for forming such foams comprises the steps of hydrating finely divided particulate silicates with water and expanding the mass by input of thermal energy. The thermal energy can be provided by a conventional heat source, by a microwave energy source or by dissipation of mechanical energy in the material. The silicate may be sodium silicate and the sodium silicate may have a ratio of $SiO_2$ to $Na_2O$ of 1:1 to 5:1 (or more). The hydrated material may further comprise other alkali metal silicates. It may further contain complexing agents to insolubilize the resulting foam, and other additives to impart desirable physical or chemical characteristics. This method can yield water resistant or insoluble silicate foams of microcellular closed cell structure, 2 to 8 p.c.f. density, high strength-to-density ratio, and low thermal conductivity.

CROSS REFERENCE TO RELATED APPLICATIONS

This application is a continuation-in-part of copending application Ser. No. 875,568, filed Nov. 10, 1969, which is now abandoned.

This invention relates to a process for the production of silicate foams from sodium silicates and other alkali metal silicates.

There has been a growing demand for a lightweight, completely inorganic and fireproof cellular foam material for use in building construction, as a heat and sound insulation in sandwich panels and industrial applications. The well known organic foams such as polystyrene and polyurethane have found widespread acceptance because of low density and low thermal conductivity, but they degrade very rapidly under heat and are thus unsuited for applications where temperature resistance and incombustibility are essential. On the other hand, inorganic structural materials classified as "light weight" such as foamed concrete, foamed clay, and combinations of expanded perlite or vermiculite with cementitious binders, lack appropriate thermal and sound insulation properties and generally combine greater rigidity with substantially higher density, compared to organic foams.

The present invention therefore provides a process for forming silicate foam comprising the steps of:

(a) Hydrating finely divided alkali metal silicate, containing less than 5% water, the resulting hydrated material containing water in an amount about 5 to 30% by weight and, (b) Thermally expanding the resulting hydrated material.

The silicate may be a substantially anhydrous solid. Preferably, the particles of silicate may have a uniform particle size distribution.

In accordance with another aspect, the present invention provides such a process wherein said particles of silicate have a uniform controlled particle size distribution.

In accordance with another aspect, the present invention provides a process for forming silicate foam comprising the steps of:

(a) Hydrating finely divided alkali metal silicate with water, water vapour or steam at temperatures in the range of 20 to 350° C., the resulting hydrated material containing water in an amount of 5 to 30% by weight and, (b) Expanding the resulting hydrated material by rapidly vaporizing the water of hydration through the input of thermal energy.

The present invention further provides a process wherein the resulting hydrated silicate material contains 10 to 25% by weight of water of hydration.

In one aspect, such a foam may have a density between 1 and 15 lbs. per cubic foot and thermal conductivity between 0.2 and 0.6 B.t.u. per hour, per square foot, per degree Farenheit, per inch.

In a preferred aspect, the present invention provides a water resistant or insoluble silicate foam or product made thereof, having the following preferred characteristics and physical properties:

(a) Microcellular closed cell structure
(b) Density between 2 pound per cubic foot and 8 pound per cubic foot
(c) Thermal conductivity factor ("K") at 75° F. mean temp. of .200 and .400 B.t.u./hr./sq. ft./in. ° F.
(d) Compressive strength at 5% deformation from 20 p.s.i. to 150 p.s.i.

It has been shown that inorganic foams based upon alkali metal silicates may exhibit properties which are important for the above stated applications. For example, typical silicate foams are rigid and incombustible and do not contribute fuel or smoke in case of a fire. Depending on composition they stand temperatures from no less than 900° F. to 1400° F. without degradation. They are inert to organic solvents, odorless, non-toxic and will not support mould growth.

It has also been shown that integral silicate foams may exhibit desirably low thermal conductivity and combine high compressive strength with low density under circumstances discussed below, but not readily realized to date in a commercially viable process. Moreover, prior methods have not resulted in such integral foam of commercially necessary resistance to attack by water or atmospheric moisture at elevated temperatures coupled with the physical characteristics enumerated above.

It has been found in practice, that objectionable shrinkage with weakening and deterioration of the insulating structure does occur and that this shrinkage can amount to as much as 35% upon exposure of the foam articles for 20 hours at 80% relative humidity and 100° F.

It has now been found that such undesired thermal and chemical instability of prior foamed alkali metal silicates, when exposed to adverse thermal and other conditions of use can be effectively remedied. By the practice of this invention it is possible to make a novel, high temperature resistant alkali metal silicate insulating composition exhibiting good stability against undesired shrinkage. It should be possible to produce a foam which remains dimensionally stable as a thermal insulating material upon prolonged exposure to temperatures ranging from 700 to 1000° C.

These objects are attainable in this invention which embodies the discovery that objectionable thermal and chemical instability encountered in utilizing foamed alkali metal silicates, particularly tri and tetra and penta silicates of sodium, can be remedied and that the dimensional stability of said silicate foams can be advantageously enhanced.

It is an objective of this invention to provide a technically and economically viable process for the manufacture of silicate foams of controlled water-solubility, low density, low thermal conductivity, and high strength to-weight ratio, based upon sodium and other alkali metal silicates as the main raw materials.

Commercially, alkali metal silicates are manufactured by heating a mixture of an alkali compound and silica at around 2700° F. until a technically homogeneous glass is formed, then cooling the alkali metal silicate glass ("water glass") or quenching and dissolving it in water. Alkali metal silicates for general commercial use are manufactured with ratios of $SiO_2$ to $R_2O$ (R=Na, K, Li, Rb, Cs) ranging from 1:1 to 3.75:1, while higher ratios up to 5:1 are less readily dissolved in water, hence of lesser commercial interest.

Prior methods for the preparation of alkali silicate foams by thermal chemical or mechanical means generally involve the use of the commercially available aqueous alkali metal silicate solutions, most frequently of sodium silicate solutions, which contain between 50 and 70% of water. No matter what method is used for the preparation of an anhydrous silicate foam, the removal of the water entails considerable energy, and long curing cycles. In the method of foaming sodium silicate solutions by rapidly heating them, it has been moreover shown that all water in excess of about 35%–40% by weight of the material has to be removed before a foamable consistency is approached. Quite apart from the fact that this adds to the cost of the process, it is characteristic of sodium silicate solutions that viscosity changes and skinning during the step of removing this excess water lead to non-uniform dehydration and hence to non-uniform cell type and cell size upon foaming.

In those earlier methods where a foamable gel hydrate is prepared by suitable adjustment of the pH in alkali metal silicate solutions, or by adding to them insolubilizing or complexing agents, it is further observed that the water content is not readily removed and particularly not in a uniformly controllable fashion. Similarly, it is observed that such complexing agents are not as uniformly distributed and reacted throughout the gel hydrate as one would expect in an aqueous system. Since the water contained in the silicate hydrate acts as the sole or prime blowing agent, it is easily understood that non-uniform distribution of the water of hydration within the mass must lead to non-uniform cell growth, size and configuration. Similarly, non-uniformity of the complexing reactions, entail non-uniformity and undesirable properties in the finished silicate foam. Further, the use of aqueous alkali metal silicate solutions as starting materials for foam production restricts the choice of $SiO_2$-to-$R_2O$ ratios to those readily soluble, while higher ratio silicates can be expected to impart lower solubility characteristics to the foam, and therefore to be preferable from the point of view of imparting low solubility characteristics to the foam.

The present invention has as one objective to provide a process for the manufacture of silicate foams which obviates or reduces the shortcomings of the prior art, and which therefore results in the products of superior properties.

In certain aspects the process of the invention is directed at:

(a) The preparation, directly from substantially anhydrous silicate glasses of pure or polymerized silicate hydrates of maximum homogeneity, controlled content of water of hydration, and controlled composition, this first step followed by:

(b) The expansion to foam of these silicate hydrates by thermal energy input; with the water of hydration acting as the blowing agent.

The starting material will normally be substantially anhydrous alkali metal silicate, such as powdered water glass having a composition $R_2O.xSiO_2$ where X can very between 1 and 6, and R is any one or a combination of Na, K, Li, Rb and Cs. The particulate alkali metal silicate may be in a molten state, or, as discussed in detail herein, it may consist of a finely divided alkali metal silicate of controlled average particle size.

The hydrated mass can be suitably shaped and then expanded by rapid input of thermal energy, which may be provided by a source of conventional heat, microwave energy, dissipation of mechanical energy and/or an exothermic reagent to provide part or all of the heat input. Alternatively, the hydrated mass can be uniformly heated under sufficient pressure to prevent loss by evaporation of the water of hydration which, upon rapid release of the pressure, will then act as blowing agent and expand the mass. In a further alternative, the hydrated mass can be granulated to a powder having a uniform controlled particle size distribution, and thermally expanded with or without moulding.

In another embodiment, such a process may comprise the steps of preparing a finely divided alkali metal silicate, preparing a finely divided powder, dispersion or solution of a complexing agent, mixing these components in suitable proportions with water, water vapors and/or steam at a controlled temperature in the range from 20° C. to 350° C., under superatmospheric pressure if desired, for a predetermined length of time to ensure uniform hydration and insolubilization, the resulting hydrated material containing water in an amount of 5–30% by weight, and storing the hydrated mass for processing at a later time, or further processing it immediately into a microcellular silicate foam by one of several methods indicated above.

In further embodiments, the process visualizes the inclusion of other materials, additives, fillers or the like along with the basic ingredients in order to impart to the silicate hydrates and to the resulting foams specific desirable properties, but without substantially modifying the principle of the invention.

To those familiar with the art it will be obvious that the conditions under which the principle of the process can be practiced can vary widely with the choice of raw materials, their particle size and steam temperature and pressures. For example one would expect a slower rate of hydration for coarser particles, materials of lesser solubility or reactivity at lower temperatures and pressures, while conversely the desired uniform hydration could be expected at a faster rate with finer particles, more soluble or reactive materials, at higher temperatures and pressures. In this respect therefore the examples given below to illustrate some of the experimentation supporting this invention are neither comprehensive nor limiting in scope. They are however meant to convey that given a particle size in the preferred range, and other appropriately chosen process conditions, rapid and homogeneous hydration results in silicate hydrates of the uniformly controlled content of water which is an absolute pre-requisite for the preparation by thermal expansion of the micro-cellular foams of controlled density which are the ultimate objective of the invention.

The water of hydration appears to have a dual function, since it operates as a foaming agent, and also is an important variable affecting the visco-elastic behaviour of the silicate hydrates before and during the process of foaming (expansion) by thermal means to form silicate foam products.

Close control and uniformity of hydrate water content, along with other process variables, affects the number, size, shape and integrity of the cells which make up the foam. With a given bulk density (pound per cu. ft.), a foam consisting of microscopic fully closed cells will exhibit higher compressive strength, lower thermal conductivity, and less water vapour permeability than a coarse, open cell foam of the same chemical composition. Given in addition a greater freedom in choice of raw materials for the preparation of foamable hydrated silicates, the products of the process of this invention are found to offer a higher degree of insolubility than foams of prior art along with the physical characteristics reported in the examples which follow.

EXAMPLE I

Sodium silicate particles having a particle size of 80–100 microns ($\gamma$) were suspended in 20% water with 0.1% of Triton X–100 (trademark of Rohm and Haas Co.) surfactant and blended in a mixer at a rate of 2000 r.p.m. for a period of 20 minutes. The resulting mixture was placed in an autoclave under a steam pressure of 15 p.s.i. After 30 minutes, the slurry became completely hydrated and viscoplastic.

The block of sodium silicate hydrate was then compressed at 100° C. in a mold applying a pressure of 200 p.s.i. for 5 minutes. The monolithic block was removed from the mold and foamed by applying microwave energy at a frequency of 2450 megacycles (mcs.) The composition used in Example I is listed in Table I.

TABLE I

| Composition of the mix | Grams | Density of form, p.c.f. | Compressive strength, p.s.i. |
| --- | --- | --- | --- |
| Sod. silicate SS–65 ($SiO_2/Na_2O$ mole ratio 3.22) | 653 | 7.5 | 25 |
| Water | 129 | | |
| Triton X–100 | 0.8 | | |

NOTE.—This produced a water soluble foam.

The foam had closed pores, but when tested for moisture resistance, in an autoclave at 5 p.s.i. pressure of steam for 15 minutes, the foam collapsed and dissolved.

EXAMPLE II

A mixture containing 653 gms. of powdered sodium silicate, 40 gms. of boric acid, 52 gms. of aluminum hydroxide, 2.5 gms. of zinc dust, and 2.5 gms. of titanium hydroxide was dry blended with a conventional blade type mixer. The material was then blended with 251 gms. of water and continuously hydrated in an autoclave using a steam pressure of 15 p.s.i. After 15 minutes of autoclaving, the viscoplastic hydrate was compressed at 110° C. using a 200 p.s.i. pressure. The monolithic hydrate obtained was foamed in a microwave oven using 2450 mcs. frequency waves. The resulting foam was microcellular and rigid. The composition of the mix and the properties of the foam are tabulated in Table II.

TABLE II

| Composition | Grams | $SiO_2/Na_2O$, mole ratio in sod.sil. | Density of foam, p.c.f. | Moisture absorption on exposure to 5 p.s.i. steam for 1 hr., percent |
| --- | --- | --- | --- | --- |
| SS–65 | 653 | 3.22 | 9.9 | 18 |
| Al(OH)$_3$ | 52 | | | |
| H$_3$BO$_3$ | 40 | | | |
| Zn dust | 2.5 | | | |
| Ti(OH)$_4$ | 2.5 | | | |
| H$_2$O | 231 | | | |
| Triton X–100 | 1 | | | |

The foam on exposure to 5 p.s.i. of steam for 60 minutes maintained its original integrity and strength. It is thus considered substantially water insoluble for many practical end uses.

EXAMPLE III

Employing the equipment and procedure described in Example II, the following mix was foamed in a microwave oven.

| | Gms. |
| --- | --- |
| SS–65 | 653 |
| $H_3BO_3$ | 45 |
| $Ti(OH)_4 \cdot nH_2O$ | 25 |
| $H_2O$ | 231 |
| Zn | 2.5 |
| Igepol CO 630 [1] | 0.5 |

[1] Trademark of BASF.

The resulting foam was microcellular and had closed cells. It had a density of 6.5 p.c.f. and a compression strength of 50 p.s.i. at 10% deformation. It was dimensionally stable up to 1000° F. for several hours. After exposure to 96% relative humidity (RH) at 120° F. for 96 hrs., the foam retained its dimensional stability and original strength properties, but absorbed about 28% moisture.

EXAMPLE IV

Soda ash, silica and aluminum fluoride were melted in a platinum crucible to obtain a modified silicate of sodium having the following composition: $Na_2O \cdot 4SiO_2 \cdot 0.2AlF_3$. The above silicate glass was powdered to obtain particles of 50–100$\mu$ diameter and was then hydrolysed in an autoclave at 1500 p.s.i. steam pressure. The duration of autoclaving varied from 10 minutes to 1 hour depending on the particle size. The resulting hydrate contained 18% water. It was foamed in a microwave oven to give closed cell microcellular rigid foam of 9 p.c.f. density. The foam had excellent moisture resistance, as demonstrated by the fact that it absorbed only 2% of moisture on exposure to 5 p.s.i. steam for 30 minutes. It had a softening point of 1150° F., much higher than those observed before for sodium silicate foams.

EXAMPLE V

Sodium silicate having a $SiO_2/Na_2O$ ratio of 4:1 was hydrated using the conditions and equipment specified in Example IV, and foamed in a microwave oven to obtain largely open-pore silicate foam. The foam had a density of 7.8 p.c.f. and being water soluble was degraded rapidly on exposure to 96% RH at 120° F. The hydrate used in the foaming had a water content of 18%.

EXAMPLE VI

Sodium silicate having a $SiO_2/Na_2O$ ratio of 5:1 was hydrated using the conditions and equipment specified in Example IV and foamed in a microwave oven to obtain largely closed pore silicate foam. The foam had a density of 8 p.c.f. and had excellent moisture resistance. On exposure to 5 p.s.i. steam in an autoclave for 15 minutes, the foam absorbed only 1.5% of water. It substantially retained its original strength and dimensional stability. The hydrate used in the foaming had a water content of 20%.

EXAMPLE VII (1) 882 gms. of sodium silicate having an $SiO_2/Na_2O$ ratio of 3.2:1 was dispersed in 300 cc. of water containing 0.5 gm. of the surfactant Triton X–100 (trademark) for 4 minutes with a conventional blade-type mixer.

(2) 60 gms. of boric acid and 40 gms. of aluminum hydroxide was added and the mixing continued for 4 more minutes.

(3) 5 gms. of commercial polyethylene powder (microthene FN–500, trademark of U.S. Industries Inc.) and 20 gms. of 10$\mu$ diameter magnesium powder were introduced to the above slurry and blended for an additional 5 minutes.

(4) The mixture resulting from Step 3 was hydrated in an autoclave at 15 p.s.i. steam pressure for 30 minutes and the hydrated mass was then compressed for 5 minutes at 102° C. using 220 p.s.i. pressure to obtain a monolithic plastic mass. The plastic mass was expanded by heating for 9 minutes in a microwave oven of 1.5 kw. power at 2450 mcs. The foam obtained by this procedure had closed cells and had a density of 6.8 p.c.f. It had a thermal conductivity (K) of 0.31 at 75° F., and a compressive strength of 45 p.s.i. at 5% deformation. On exposure to 98% RH at 120° F. at 96 hrs., the foam absorbed 18% moisture, but retained its original strength and dimensions.

EXAMPLE VIII

Reinforced foamed silicate

Employing the procedure and equipment described in Example 1, the following mix was foamed in a microwave oven.

Mix

| | |
|---|---|
| SS-65 | 653 gms. $SiO_2/Na_2O=3.2:1$. |
| RH-730 | 52 gms. (trademark of Reynolds Metal Company). |
| $H_3BO_3$ | 52 gms. |
| Cal. tetraborate | 9 gms. |
| FN 500 | 18 gms. polyethylene(microthene from U.S. Industries). |
| $Ti(OH)_4$ | 2.5 gms. |
| Zn | 2.5 gms. |
| $MOClnH_2O$ | 1 gm. |
| $H_2O$ | 231 gms. |
| Triton X-100 | 0.1 gm. (surfactant). |
| Igepol 6630 | 0.3 gm. (trademark of BASF). |
| Chopped glass fibers | 36 gms. |

These fibers used in this mix were $10\mu$ in diameter and $\frac{1}{32}$ in. in length. The foam product, obtained by this method had a density of 13 p.c.f. and a compressive strength of 148 p.s.i. at 10% deformation. It retained its strength and thermal properties (such as heat insulation and heat resistance) after exposure to 100% RH for 96 hours at 120° F.

EXAMPLE IX

The glass fiber of Example VIII was replaced with finely divided mica flakes and the foaming procedure was repeated. The rigid foam so obtained had a density of 15 p.c.f. and a compression strength of 158 p.s.i.

EXAMPLE X

Sintering process

Employing the method and equipment described in the first part of Example II, the following mix was hydrated in an autoclave for 15 minutes. The hydrate was removed from the autoclave and cooled to room temperature, to obtain a hard solid block. This was powdered in a laboratory mill to produce −32 mesh size particles (on the U.S. Standard scale) and processed at 800 p.s.i. for 5 minutes at ambient temperature in a laboratory hydraulic press. The translucent semi solid block obtained is formed by the input of microwave energy. The foam had a density of 4.87 p.c.f.

Mix composition

| | Grams |
|---|---|
| Sodium silicate S.S. 65 | 900 |
| Polyethylene(microthene) | 50 |
| Boric acid | 25 |
| Aluminum hydroxide | 25 |
| Titanium hydroxide | 5 |
| Water | 231 |

EXAMPLE XI

Sintering process

Utilizing the process and equipment described in the first part of Example II, the following composition was hydrated in an autoclave for 15 minutes. The hydrate on cooling was powdered to −32 mesh (U.S. Standard) and compressed in a mold of 105° C. using a 600 p.s.i. pressure. After 10 minutes, the semi solid block of hydrate removed from the mold was foamed in a microwave oven, using 1.5 kw. power at 2450 mcs. This highly insolubilized foam had a density of 10.5 p.c.f.

Composition

| | Gms. |
|---|---|
| Sodium silicate S.S. 65 | 882 |
| Boric acid | 60 |
| Aluminum hydroxide | 40 |
| Polyethylene(microthene) | 10 |
| Igepol surfactant | 5 |
| Water | 210 |

What is claimed is:

1. A process for forming high strength rigid silicate foam comprising the steps of:
    (a) hydrating finely divided substantially anhydrous solid alkali metal silicate, the resulting hydrated material containing water in an amount of about 5 to about 40% by weight and,
    (b) thermally foaming the resulting hydrated material by input of external energy, using said water as the foaming agent.

2. A process as in claim 1, wherein the alkali metal silicate is a molten silicate.

3. A process according to claim 1 wherein the hydrating step is carried out under superatmospheric pressure.

4. A process according to claim 1 wherein the hydrated silicate is shaped by moulding and compacting before foaming.

5. A process as in claim 12 wherein the sodium silicate has a ratio of $SiO_2$ to $Na_2O$ of 1:1 to 6:1.

6. A process as in claim 12 wherein the sodium silicate has a ratio of 2.8:1 to 5:1.

7. A process as in claim 1 wherein the hydrated silicate material further comprises a complexing agent to insolubilize the resulting foam.

8. A process as in claim 1 wherein the particle size is within the range of 5 to 40 micron.

9. A process as in claim 1 wherein the step of hydration is carried out in the temperature range of 30° C. to 150° C.

10. A process as in claim 1, wherein the resulting hydrated silicate material contains 10 to 25% by weight of water of hydration.

11. A process as in claim 1 wherein the alkali metal silicate is chosen from the group consisting of silicates of sodium, potassium and lithium.

12. A process as in claim 11 wherein the alkali metal silicate is a sodium silicate.

13. A process according to claim 1 wherein the hydrating step is carried out at a temperature in the range 20° to 350° C.

14. A process according to claim 13 wherein the finely divided silicate has a uniform controlled particle size distribution.

15. A process according to claim 14 wherein the average diameter of the finely divided silicate particles is in the range of from 5 microns to 250 microns.

16. A process according to claim 14 wherein the hydrated silicate is expanded by the input of thermal energy.

17. A process according to claim 16 wherein the thermal energy is provided by application of microwave energy to the hydrated silicate.

(References on following page)

References Cited

UNITED STATES PATENTS

| | | | |
|---|---|---|---|
| 3,508,940 | 4/1970 | Webb | 106—75 X |
| 3,396,112 | 8/1968 | Burrows | 252—62 |
| 3,184,371 | 5/1965 | Seidl | 161—193 |
| 2,101,969 | 12/1937 | Williams | 106—19 |
| 3,574,655 | 4/1971 | Goldsmith | 106—40 R |
| 3,592,619 | 7/1971 | Elmer et al. | 106—40 R |
| 3,608,060 | 9/1971 | Osment et al. | 106—40 R |
| 3,625,723 | 12/1971 | Sicka | 106—40 R |
| 3,649,315 | 3/1972 | Booth | 106—40 R |
| 3,663,249 | 5/1972 | Rao | 106—75 |
| 3,700,470 | 10/1972 | Barton | 161—159 X |

HAROLD ANSHER, Primary Examiner

U.S. Cl. X.R.

106—40 R, 75; 161—159